(12) United States Patent
Borchsenius et al.

(10) Patent No.: US 8,543,313 B2
(45) Date of Patent: Sep. 24, 2013

(54) METHOD AND DEVICE FOR DETERMINING A VIBRATION-OPTIMISED ADJUSTMENT OF AN INJECTION DEVICE

(75) Inventors: Fredrik Borchsenius, Donaustauf (DE); Thierry Caramigeas, Limoges (FR); Jürgen Fritsch, Regensburg (DE); Olivier Lobey, Nice (DE); Danica Stegemann, Regensburg (DE); Christoph Wienold, Bad Abbach (DE)

(73) Assignee: Continental Automove GmbH, Hannover (DE)

( * ) Notice: Subject to any disclaimer, the term of this patent is extended or adjusted under 35 U.S.C. 154(b) by 603 days.

(21) Appl. No.: 12/741,433

(22) PCT Filed: Oct. 31, 2008

(86) PCT No.: PCT/EP2008/064775
§ 371 (c)(1),
(2), (4) Date: Aug. 9, 2010

(87) PCT Pub. No.: WO2009/059931
PCT Pub. Date: May 14, 2009

(65) Prior Publication Data
US 2010/0318275 A1    Dec. 16, 2010

(30) Foreign Application Priority Data
Nov. 9, 2007   (DE) .................. 10 2007 053 403

(51) Int. Cl.
*B60T 7/12*    (2006.01)
(52) U.S. Cl.
USPC .......................................... 701/103; 701/111
(58) Field of Classification Search
USPC ......... 701/103–105, 111, 114, 115; 123/294, 123/299, 305, 478, 480, 434, 435
See application file for complete search history.

(56) References Cited

U.S. PATENT DOCUMENTS 6,752,126 B2 *   6/2004   Pfaeffle et al. ................ 123/436
7,454,283 B2 *   11/2008  Borchsenius et al. ........ 701/102
(Continued)

FOREIGN PATENT DOCUMENTS

| | | |
|---|---|---|
| DE | 19800039 A1 | 7/1999 |
| DE | 10061705 | 10/2002 |

(Continued)

OTHER PUBLICATIONS

International PCT Search Report, PCT/EP2008/064775, 6 pages, Mar. 25, 2009.

(Continued)

*Primary Examiner* — John Kwon
(74) *Attorney, Agent, or Firm* — King & Spalding L.L.P.

(57) ABSTRACT

In a method for determining a vibration-optimised adjustment of an injection device of an internal combustion engine, for each cycle of the internal combustion engine, a plurality of individual injections per cylinder is carried out by the injection device, each of which is defined by a relative injection moment and an individual injection quantity. A temporal course of a resulting pressure influenced by pressure waves is determined in a fuel guiding part, and the above-mentioned adjustment is determined by variation of the injection moment of at least one individual injection and/or the individual quantity, such that the adjustment is characterized by a temporal variation of the resulting pressure, which is reduced by an at least partially destructive interference between the cited pressure waves. A corresponding device can determine a vibration-optimised adjustment of an injection device, and an internal combustion engine may have such a device.

20 Claims, 8 Drawing Sheets

(56) References Cited

U.S. PATENT DOCUMENTS

| | | | |
|---|---|---|---|
| 2003/0029415 A1* | 2/2003 | Pfaeffle et al. | 123/299 |
| 2003/0188714 A1* | 10/2003 | Yamamoto et al. | 123/435 |
| 2008/0202102 A1* | 8/2008 | Rodriguez-Amaya et al. | 60/286 |
| 2008/0228374 A1* | 9/2008 | Ishizuka et al. | 701/103 |
| 2010/0132668 A1* | 6/2010 | Borchsenius et al. | 123/447 |
| 2010/0192911 A1* | 8/2010 | Borchsenius et al. | 123/456 |

FOREIGN PATENT DOCUMENTS

| | | |
|---|---|---|
| DE | 10217592 A1 | 11/2003 |
| DE | 10328789 A1 | 1/2005 |
| DE | 102005062548 A1 | 7/2007 |
| DE | 102006013493 A1 | 10/2007 |
| DE | 102006037170 A1 | 2/2008 |
| DE | 102006043326 A1 | 3/2008 |
| GB | 2402233 A | 1/2004 |

OTHER PUBLICATIONS

German Office Action, German Patent Application No. 10 2007 053 403.7-26, 4 pages.

* cited by examiner

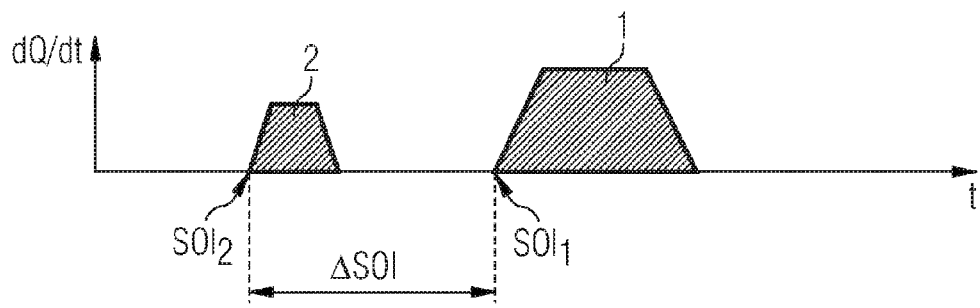
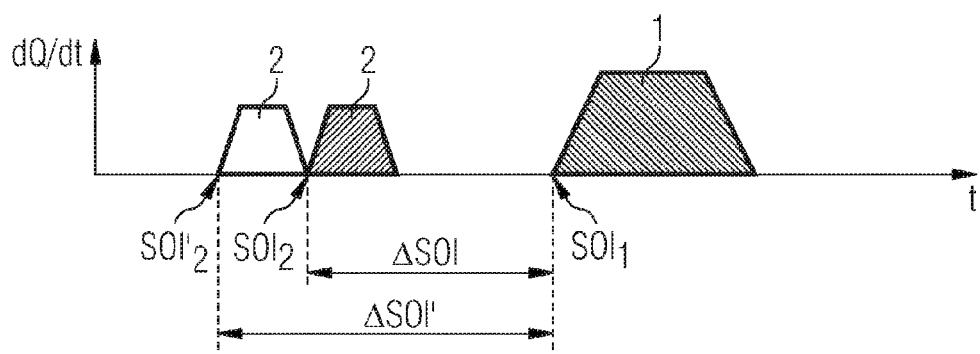
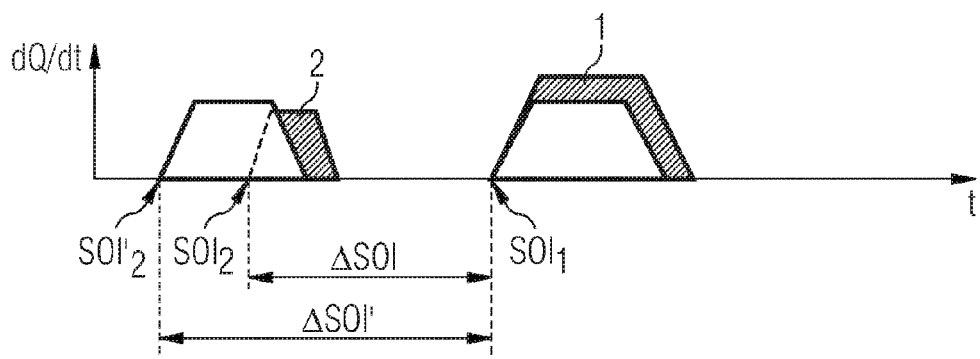

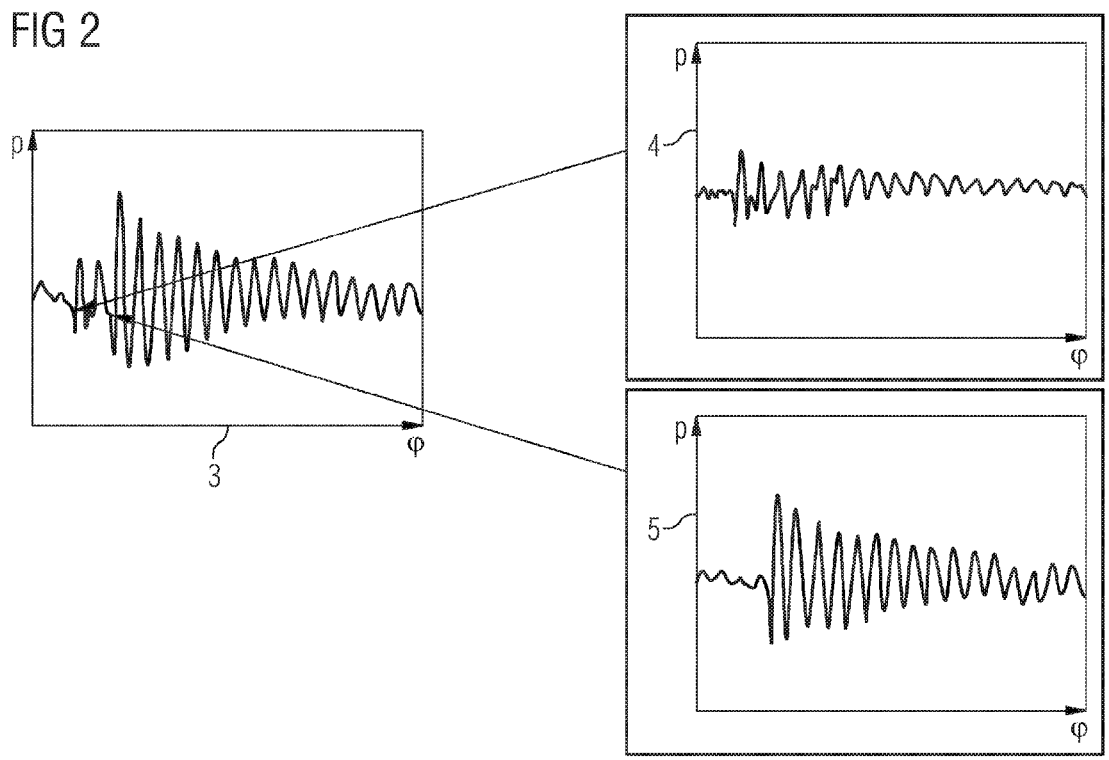

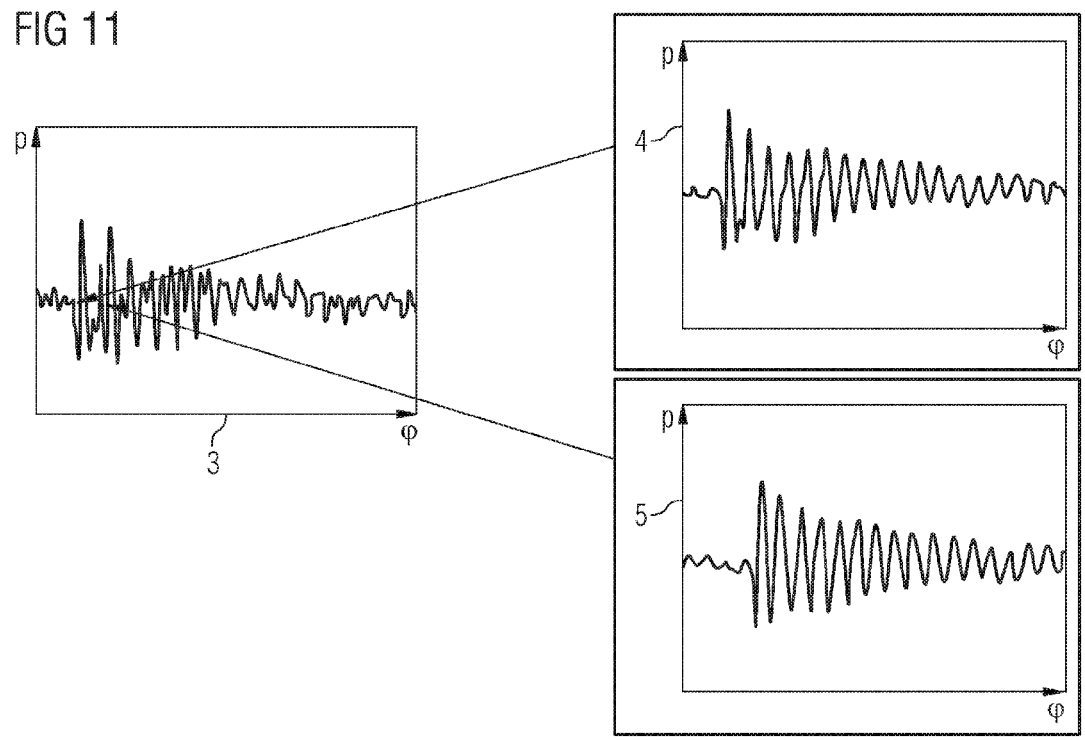

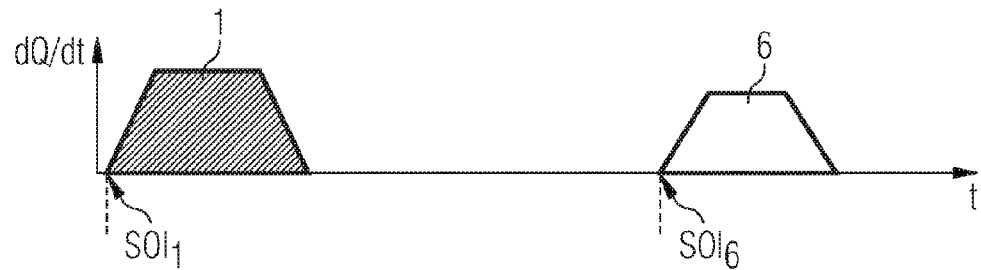
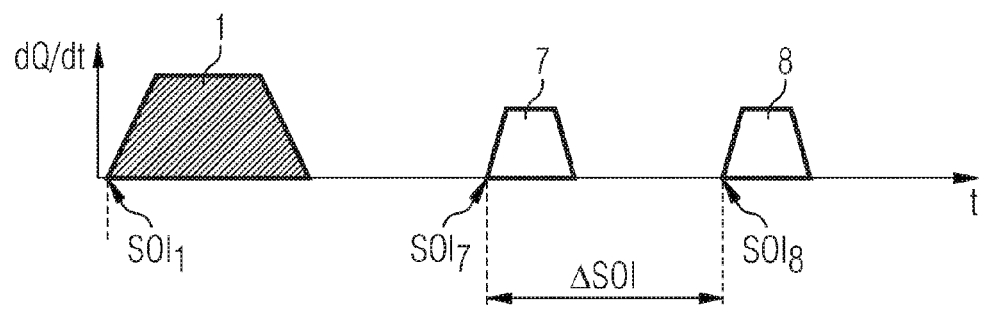
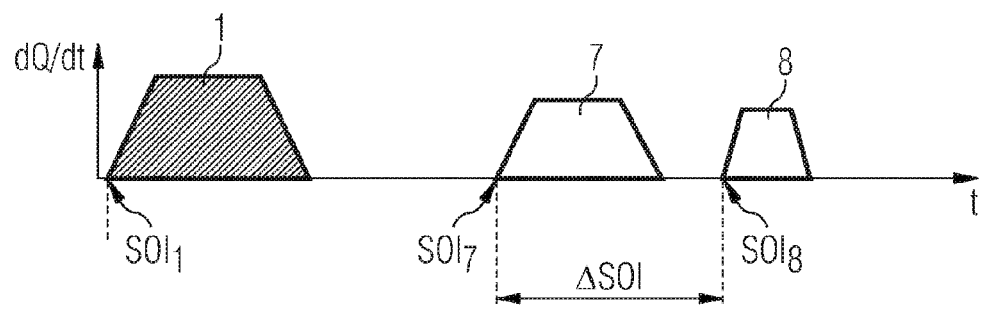

METHOD AND DEVICE FOR DETERMINING A VIBRATION-OPTIMISED ADJUSTMENT OF AN INJECTION DEVICE

CROSS-REFERENCE TO RELATED APPLICATIONS

This application is a U.S. National Stage Application of International Application No. PCT/EP2008/064775 filed Oct. 31, 2008, which designates the United States of America, and claims priority to German Application No. 10 2007 053 403.7 filed Nov. 9, 2007, the contents of which are hereby incorporated by reference in their entirety.

TECHNICAL FIELD

The present invention relates to a method of determining a vibration-optimized adjustment of an injection device of an internal combustion engine according to the preamble of the main claim as well as to a corresponding device for determining a vibration-optimized adjustment of an injection device. The invention further relates to an internal combustion engine equipped with such a device.

SUMMARY

In this case, the invention refers to the adjustment of an injection device for internal combustion engines, in which for each cycle, given a specific engine adjustment, a plurality of at least two individual injections per cylinder are provided, of which each is defined at least by an injection instant and an individual injection quantity. The injection instant in this case may be defined for example by a specific crankshaft position or a time lag relative to a defined point in a cycle of the internal combustion engine. The individual injections may be for example, in addition to a main injection, pilot injections, which are to realize a smoother ignition at the start of a working cycle, or post-injections, which may be used to regenerate a particle filter.

In the case of such injection devices each individual injection inevitably entails pressure fluctuations and a consequent propagation of pressure waves. These may be the cause of undesirable noises, vibrations and harsh running of the engine. It is known per se to reduce these disadvantageous effects by a fine adjustment of injection devices. This however entails a laborious adjustment of each individual engine that is reliant in each case upon the subjective judgment of a person adjusting the injection device.

According to various embodiments, a method can be proposed whereby an injection device of an internal combustion engine is adjustable with a view to running of the engine as silently, smoothly and with as little vibration as possible according to objective criteria and with a minimum outlay or whereby an, in this respect, vibration-optimized adjustment may be objectively determined with a low outlay. According to further embodiments, a corresponding device for determining a vibration-optimized adjustment of an injection device as well as an internal combustion engine equipped with such a device can be developed.

According to an embodiment, in a method of determining a vibration-optimized adjustment of an injection device of an internal combustion engine, for a specific engine adjustment the injection device provides for each cycle of the internal combustion engine a plurality of at least two individual injections per cylinder, each of which is defined at least by a relative injection instant and an individual injection quantity, wherein a time characteristic of a resulting pressure that is influenced by pressure waves caused by the individual injections is determined in a fuel-carrying part of the injection device, wherein said adjustment is determined by varying the injection instant of at least one individual injection and/or the individual injection quantity of at least one individual injection in such a way that this adjustment is characterized by a reduced temporal fluctuation of the resulting pressure as a result of at least partially destructive interferences between said pressure waves.

According to a further embodiment, the adjustment can be determined automatically by using an optimization algorithm. According to a further embodiment, the at least one varied injection instant and/or the at least one varied individual injection quantity for determining the adjustment can be varied only within defined limits. According to a further embodiment, the adjustment can be determined as meeting at least one of the following criteria:—a greatest amplitude of a resulting pressure fluctuation of the resulting pressure assumes an absolute or relative minimum and/or falls below a defined threshold,—a greatest amplitude of frequency components of the resulting pressure fluctuation that fall into a defined frequency band assumes an absolute or relative minimum and/or falls below a defined threshold,—a squared amplitude of the resulting pressure fluctuation that is integrated over a defined part of a cycle assumes an absolute or relative minimum and/or falls below a defined threshold,—a squared amplitude of frequency components of the resulting pressure fluctuation that is integrated over a defined frequency band assumes an absolute or relative minimum and/or falls below a defined threshold. According to a further embodiment, the adjustment can be determined computationally, wherein the time characteristic of the resulting pressure is determined by simulation. According to a further embodiment, for determining the time characteristic of the resulting pressure a pressure characteristic originating from an individual injection can be determined by simulation and the resulting pressure is determined by superposition of such pressure characteristics. According to a further embodiment, the simulation can be implemented by means of a hydraulic model while simultaneously taking into account at least one subgroup of the following parameters: fuel temperature, initial pressure of the fuel, elastic modulus of the fuel, density of the fuel, viscosity of the fuel, sound velocity in the fuel, engine speed, engine power. According to a further embodiment, at least one subgroup of the parameters that are taken into account for the simulation can be measured at the running internal combustion engine by means of at least one sensor. According to a further embodiment, the time characteristic of the resulting pressure can be measured by a pressure sensor and the adjustment is determined empirically during operation of the internal combustion engine by acquiring a dependence of the temporal fluctuations of the resulting pressure upon the varied quantities. According to a further embodiment, in addition the injection device can be adjusted automatically in accordance with the adjustment thus determined. According to a further embodiment, the method can be implemented at a correspondingly programmed control unit of the internal combustion engine. According to a further embodiment, the plurality of individual injections may comprise in addition to a main injection at least one pilot injection and/or one post-injection. According to a further embodiment, for determining the adjustment the injection instant of the pilot injection or of the post-injection can be varied relative to the injection instant of the main injection. According to a further embodiment, for determining the adjustment the individual injection quantity of the pilot injection can be varied, while the total injection quantity remains constant. According to a further embodiment, for determining the adjustment in addition the number of individual injections per cylinder and cycle can be varied. According to a further embodiment, at least one pilot injection or one post-injection is apportioned to at least two individual injections and a relative time interval between the at least two individual injections and/or an apportionment of a post-injection quantity to the individual injections can be varied in order to determine the adjustment.

According to another embodiment, a device for determining a vibration-optimized adjustment of an injection device of an internal combustion engine can be devised in terms of programming to implement a method as described above.

According to a further embodiment of the device, the device may comprise an engine control unit or part of an engine control unit. According to a further embodiment of the device, the device may comprise at least one sensor for acquiring parameters that are taken into account when determining the vibration-optimized adjustment.

According to yet another embodiment, an internal combustion engine may comprise a device as described above.

BRIEF DESCRIPTION OF THE DRAWINGS

There now follows a description of exemplary embodiments with reference to FIGS. 1 to 15. These show FIG. 1 a diagram, in which an injected fuel quantity during an injection operation comprising a main injection and a pilot injection is plotted as a function of time, FIG. 2 a characteristic of a time-dependent resulting pressure in a fuel line of an injection device as a function of a crankshaft angle and its composition of two pressure waves attributable in each case to an individual injection, FIG. 3 in a representation corresponding to FIG. 1 an illustration of a variation of an injection instant of the pilot injection, FIG. 4 in a diagram as a function of the crankshaft angle the resulting pressure in said fuel line before and after an advance of the injection instant of the pilot injection, FIG. 5 as a function of a vibration frequency an amplitude spectrum of the time characteristic of the resulting pressure of FIG. 4, FIG. 6 in a representation corresponding to FIG. 4 the resulting pressure as a function of the crankshaft angle before and after a deferment of the injection instant of the pilot injection to a later injection instant, FIG. 7 in a representation corresponding to FIG. 5 an amplitude spectrum for the time-dependent characteristics of the resulting pressure in the two situations shown in FIG. 6, FIG. 8 in a representation corresponding to FIG. 3 a variation of the injection instant of the pilot injection with simultaneous variation of an individual injection quantity of the pilot injection, FIG. 9 in a representation corresponding to FIG. 4 the characteristic of the resulting pressure in the fuel line as a function of the crankshaft angle before and after the variation of FIG. 8, FIG. 10 in a representation corresponding to FIG. 5 the amplitude spectra of the characteristics of the resulting pressure of FIG. 9, FIG. 11 in a representation corresponding to FIG. 2 the resulting pressure after the variation of FIG. 8 as well as its composition of the pressure waves originating from the individual injections, FIG. 12 in a representation corresponding to FIG. 1 an injection operation comprising a main injection and a post-injection, FIG. 13 in a representation corresponding to FIG. 12 the corresponding injection operation after an apportionment of the post-injection to two individual injections, FIG. 14 in a corresponding representation the injection operation of FIG. 13 after a variation of an individual injection quantity of the individual injections originating from the post-injection, and FIG. 15 a diagram with frequency-dependent amplitude spectra for the injection operations of FIGS. 12 to 14.

DETAILED DESCRIPTION

Figure 4:
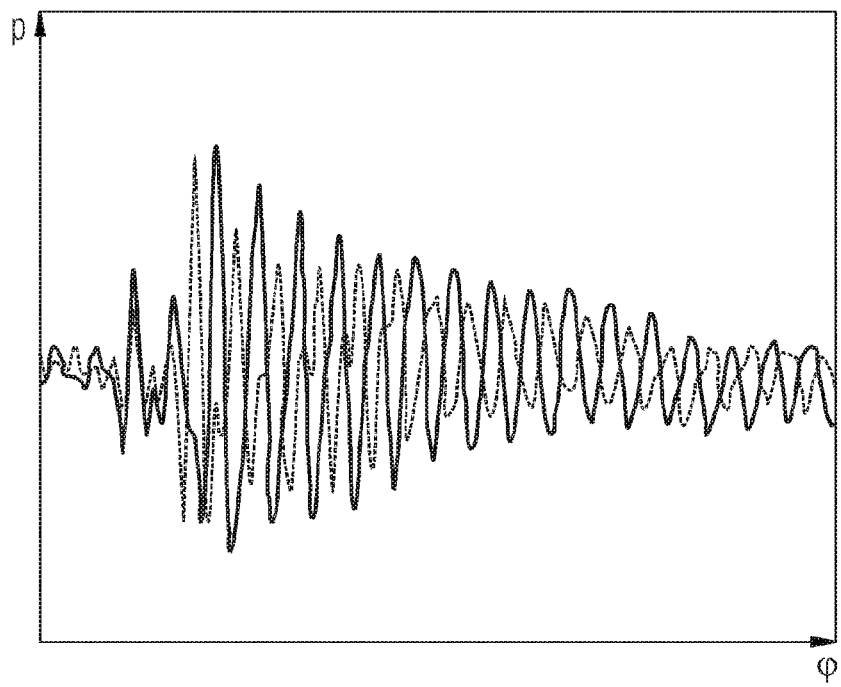

The method according to various embodiments provides that a time characteristic of a resultant pressure, which is influenced by pressure waves caused by the individual injections, is determined in a fuel-carrying part of the injection device, wherein said adjustment is determined by varying the injection instant of at least one individual injection and/or the individual injection quantity of at least one individual injection in such a way that said adjustment is characterized by a reduced temporal fluctuation of the resultant pressure as a result of at least partially destructive interferences between said pressure waves. Said resultant pressure in this case may be both a measured actual pressure and a pressure value calculated by simulation. The injection device will be typically a so-called common rail system, wherein the internal combustion engine may be a diesel engine or a spark-ignition engine. In this case, the adjustment of the injection device determined in the described manner may be described as vibration-optimized in the sense of the present specification also when it realizes only a relative optimum compared to other possible adjustments. Typically, the described adjustment is determined at least also by varying the injection instant of at least one individual injection, wherein this injection instant may be defined for example as the instant of a start of the respective individual injection, namely relative to a specific instant of a working cycle of the internal combustion engine, which in turn may be defined for example by a specific crankshaft position in a specific power stroke.

An embodiment provides that said adjustment of the injection device is determined automatically by using an optimization algorithm. In this case, it is typically provided that the at least one varied injection instant and/or the at least one varied individual injection quantity for determining said adjustment is varied in each case only within defined limits, which will depend upon a respective engine adjustment. These limits may be defined for example in that a sum over all individual injections as well as an injection instant of a main injection are held constant, while an injection instant of a pilot injection and/or a relative gap between two pilot injections is varied within a small interval. The small interval will in this case arise from the fact that an approximate instant of the respective pilot injection is defined by a desired function of this pilot injection.

By means of the method it is possible to determine in each case a vibration-optimized adjustment of the injection device for various engine running states that may be defined by parameters such as engine speed and charge-air pressure. In this case, it is possible for example with the aid of the described method to determine a characteristic map that defines injection instants and individual injection quantities of the in each case vibration-optimized adjustment for every possible engine running state.

Typical embodiments provide that said adjustment is determined as meeting at least one of the criteria described below:

It may for example be provided that during the adjustment to be determined a greatest amplitude of a resulting pressure fluctuation of the resulting pressure assumes an absolute or relative minimum or falls below a defined threshold. An analysis of the time characteristic of the resultant pressure that is needed to determine this adjustment may in this case be limited to a working cycle, occasionally also to a defined smaller time area around an instant of a main injection or around a top dead center prior to a power stroke of a respective analyzed cylinder.

Alternatively or additionally it may be provided that during the adjustment to be determined a greatest amplitude of frequency components of the resulting pressure fluctuations that fall into a defined frequency band assumes an absolute or relative minimum or falls below a defined threshold. Said frequency band may additionally be selected for example in such a way that a frequency of a mechanical resonance of the internal combustion engine that is particularly critical for noise- or vibration generation of the internal combustion engine falls into this frequency band. The described criterion then fulfils the purpose of minimizing a noise generation or harshness that is linked to this resonance.

The adjustment to be determined may additionally be selected in such a way that a squared amplitude of the resulting pressure fluctuation that is integrated over a defined part of a cycle of the internal combustion engine assumes an absolute or relative minimum or falls below a defined threshold. For this purpose, the squared amplitude may be integrated for example over time or the crankshaft angle of rotation. It is then possible to find an adjustment that is characterized by as low a vibrational energy as possible.

Finally, said adjustment may alternatively or additionally be determined in that during this adjustment a squared amplitude of frequency components of the resulting pressure fluctuation that is integrated over a defined frequency band assumes an absolute or relative minimum or falls below a defined threshold, wherein the frequency-dependent squared amplitude for this purpose may also be weighted with a non-constant weighting function. In this way it is again possible to take into account mechanical resonances that fall into specific frequency bands.

Adjustments of the injection device that meet one or more of said criteria may be determined by conventional numerical or empirical optimization methods. In this case, the adjustment should be optimized separately for each cylinder or each injector, wherein alternatively as an additional boundary condition it may be required that the varied parameters are selected identically for the various cylinders. According to an embodiment, the parameters individual injection quantity and/or injection instant of the individual injections may be determined separately for each cylinder at least within specific limits.

An embodiment provides that said adjustment is determined computationally, wherein the time characteristic of the resulting pressure is determined by simulation. Hydraulic models, which allow a corresponding computational determination of the time characteristic of the resulting pressure, are common knowledge as such, for example in the form of the product AMESim of the French company IMAGINE.

For implementing the method it is then sufficient to use geometrical properties of the injection device as input parameters of the simulation program used, so that the method of determining the vibration-optimized adjustment may be implemented independently of the respective internal combustion engine and/or of the injection device to be adjusted. The resulting pressure, the relative injection instants and the individual injection quantities are then initially or exclusively operands. The implementation of the method leads in this case to a determination of optimized values for the quantities varied for determination of the adjustment, which are then transferred to the individual internal combustion engine and may be adjusted there.

Given the use of a hydraulic model for implementation of the described method, the corresponding simulation is typically carried out while simultaneously taking into account at least one subgroup of the following parameters: fuel temperature, initial pressure of the fuel, elastic modulus of the fuel, density of the fuel, viscosity of the fuel, sound velocity in the fuel, engine speed, engine power. The vibration-optimized adjustment may then be determined for various load situations of the internal combustion engine that are defined by these parameters.

For the purpose of computational simplification it may be provided that during implementation of the method for determination of the time characteristic of the resulting pressure a pressure characteristic originating from an individual injection is determined by simulation and the resulting pressure itself is then determined by superposition of such pressure characteristics. In so doing, use is made of the fact that a plurality of pressure waves in liquid propagate in very good approximation independently of one another, while interactions between the individual pressure waves that occur as a result of non-linear effects are negligible.

In an embodiment at least one subgroup of said parameters that are taken into account for the simulation is measured at the running internal combustion engine by means of at least one sensor. This may apply in particular to the fuel temperature and the initial pressure of the fuel, which may be determined by means of a conventional pressure- and/or temperature sensor. In this case, the vibration-optimized adjustment of the injection device need not be determined in advance for all conceivable engine running states. Rather, a determination of this adjustment for the in each case actual running state defined by the measured parameters is sufficient. The method may then be carried out in such a way that the vibration-optimized adjustment is not only determined but in addition the injection device is automatically adjusted in accordance with the adjustment thus determined.

An alternative to the automatic adjustment of the injection device last described arises in the case of external execution of a corresponding program for determining the vibration-optimized adjustment and subsequent (non-recurring) adjustment of the individual internal combustion engine in accordance with a result obtained by the method.

An alternative to the embodiment of the method, in which the time characteristic of the resulting pressure is determined by simulation, provides a measurement of the time characteristic of the resulting pressure by means of a pressure sensor, wherein said adjustment is then determined empirically during operation of the internal combustion engine by acquiring a dependence of the temporal fluctuations of the resulting pressure upon the varied quantities. In this case too, conventional optimization algorithms may be used. An automatic adjustment of the injection device in accordance with the empirically determined adjustment presents itself with this embodiment of the method.

It may be provided that the described method is implemented at a correspondingly programmed control unit (ECU—engine control unit) of the internal combustion engine, namely preferably on the basis of parameter values that correspond to an actual engine running state.

Typically the plurality of individual injections will comprise, in addition to a main injection, at least one pilot injection and/or one post-injection. For determining said adjustment, the injection instant of the pilot injection or of the post-injection may then be varied relative to the injection instant of the main injection. In this case, even a variation by an extremely small amount may lead advantageously to destructive interferences between pressure waves, which are triggered by the pilot injection or post-injection, and a pressure wave, which is triggered by the main injection, and hence to a comparatively low temporal fluctuation of the resulting pressure.

Alternatively or additionally for determining said adjustment the individual injection quantity of the pilot injection or of the post-injection may also be varied, in the case of a variation of the injection quantity of the pilot injection preferably in such a way that a total injection quantity remains constant.

According to an embodiment, for determining the vibration-optimized adjustment in addition the number of individual injections per cylinder and cycle is varied. In particular, starting from an initial adjustment of the injection device, a pilot injection or a post-injection may be apportioned to two or more smaller pilot injections and/or post-injections in order thereby to obtain an adjustment with a reduced temporal fluctuation of the resulting pressure. This may be achieved particularly well if in addition to the apportionment to a plurality of individual injections a relative time interval between the at least two individual injections obtained from a pilot injection or post-injection is varied in order to determine the described adjustment. In this case it is namely possible to use in particular destructive interferences between such pressure waves as are triggered by the individual injections originating from a pilot injection or post-injection. According to a further development, an apportionment of a total injection quantity to the individual injections, which originate from a pilot injection or post-injection, may possibly additionally be varied in order to determine the vibration-optimized adjustment.

A device according to various embodiments for determining a vibration-optimized adjustment of an injection device of an internal combustion engine is devised in terms of programming to implement a method of the described type. This device may comprise an engine control unit or part of an engine control unit (ECU) and preferably be designed in such a way that the injection device is automatically adjusted in accordance with the determined adjustment. Alternatively, the device may be embodied as a development tool (also known as toolbox) and be devised in such a way that it outputs as a result parameters, which characterize the vibration-optimized adjustment of the injection device and in accordance with which individual engines of the respective type may then be adjusted.

If the device comprises an engine control unit or part of an engine control unit, it may advantageously additionally comprise at least one sensor for acquiring parameters that are taken into account when determining the vibration-optimized adjustment, in particular a sensor for measuring a fuel temperature and/or a pressure sensor for determining a fuel pressure, which may be disposed for example in the fuel-carrying part of the injection device, to which said resulting pressure refers. This fuel-carrying part of the injection device may be for example a common rail.

An internal combustion engine, which comprises such a device, may advantageously be operated permanently with a vibration-optimized adjustment of the injection device, without this adjustment having to be laboriously adjusted individually for each individual engine of the corresponding type. This internal combustion engine will typically be a diesel engine or spark-ignition engine, in which the injection device is embodied preferably as a common-rail system.

FIG. 1 shows as a function of time t plotted on the abscissa a differential injection quantity dQ/dt for a cylinder of an internal combustion engine in the course of a working cycle. The internal combustion engine here and in the following is in each case a V8 diesel engine having an injection device in the form of a common-rail system. The various embodiments described with reference to this example may of course also be realized for other engines, in particular for spark-ignition engines.

FIG. 1 shows a main injection 1 having an injection instant $SOI_1$ and a pilot injection 2 having an injection instant $SOI_2$ that precedes the main injection by a time interval $\Delta SOI$. The injection instants $SOI_i$ in this case are defined in each case as the instant of a start of the respective individual injection (SOI—start of injection), i.e. here of the main injection or the pilot injection. Naturally, it could instead be possible to use an end of an individual injection to define the respective injection instant. In addition to the respective injection instant $SOI_i$, which is defined relative to an instant when in a specific stroke of the working cycle there is a specific crankshaft angle, the individual injections are determined in each case by an individual injection quantity $Q_i$, here with i=1 for the main injection and i=2 for the pilot injection.

Each of the individual injections, i.e. here the main injection 1 and the pilot injection 2, leads to a pressure fluctuation in a fuel line of the injection device, these pressure fluctuations leading in turn to the propagation of pressure waves in the injection device. A time characteristic of a resulting pressure p in this fuel line that is influenced by the pressure waves caused by the individual injections is plotted as a function of a crankshaft angle φ in a first diagram 3 of FIG. 2, wherein the crankshaft angle φ for a selected operating state of the internal combustion engine increases at a constant rate with time.

This resulting pressure p and its time characteristic are determined in the presently described embodiment by simulation with the aid of a hydraulic model. In this case, as input parameters for a program, by means of which this simulation is carried out, in addition to the quantities $Q_i$, $SOI_i$ and parameters that map the geometric properties of fuel-carrying parts of the injection device the following parameters are used: fuel temperature, engine speed, charge-air pressure or engine power as well as data relating to fuel properties, which make it possible to infer from fuel temperature and initial pressure a density of the fuel, an elastic modulus of the fuel and a viscosity of the fuel as well as a sound velocity in the fuel, which are likewise included in the simulation. The simulation may be carried out in particular by the program AMESim of IMAGINE.

In the present case, the resulting pressure p is determined in that initially by simulation using said program pressure characteristics originating from the individual injections, i.e. from the main injection 1 and the pilot injection 2, are determined, after which the resulting pressure p is determined by superposition of these pressure characteristics. A second diagram 4, which may be seen in FIG. 2, therefore shows the pressure characteristic that is caused by the pilot injection 2, while a third diagram 5 in a corresponding manner represents the pressure characteristic that is attributable to the main injection 1.

Then, using a correspondingly programmed device for determining a vibration-optimized adjustment of the injection device in a computationally implemented method an adjustment of the injection device is determined, which is characterized by a reduced temporal fluctuation of the resulting pressure p as a result of at least partially destructive interferences between said individual pressure characteristics. This may occur in various ways, wherein in each case the injection instant $SOI_i$ of at least one individual injection and/or the individual injection quantity $Q_i$ of at least one individual injection is varied in order by applying specific criteria to determine the vibration-optimized adjustment using an optimization algorithm of a conventional type. In this case, the at least one varied injection instant $SOI_i$ and/or the at least one varied individual injection quantity $Q_i$ for determining the described adjustment is varied only within defined limits, which arise as a result of boundary conditions that are in turn dependent upon an actual engine adjustment and engine load. Thus, as a rule a total injection quantity $Q=Q_1+Q_2$ as well as the injection instant $SOI_1$ will, given a specific engine speed and load, have a preset value, while the injection instant $SOI_2$ of the pilot injection 2 may shift within a defined small interval.

Figure 5:
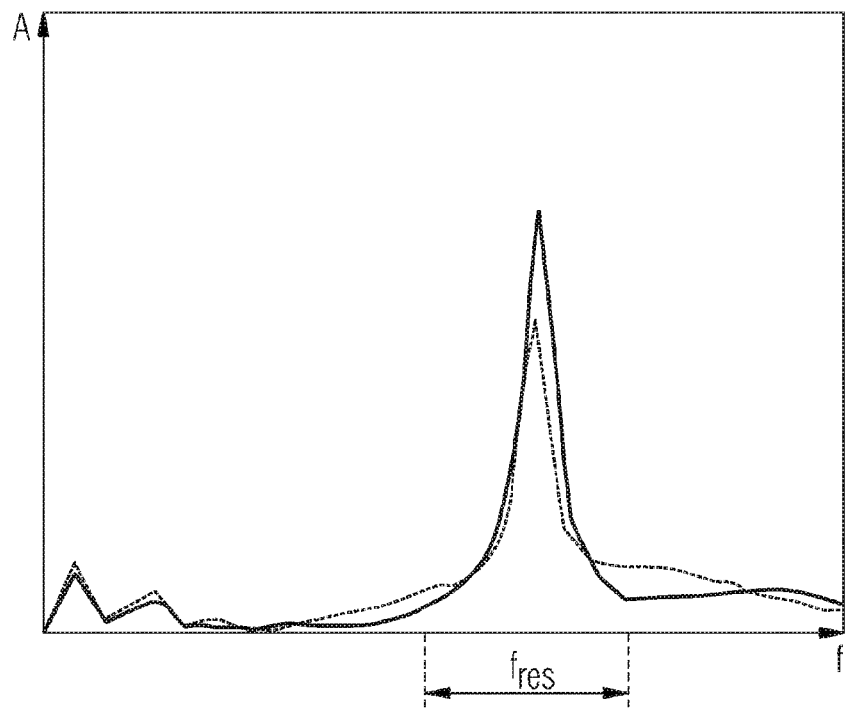
Figure 6:
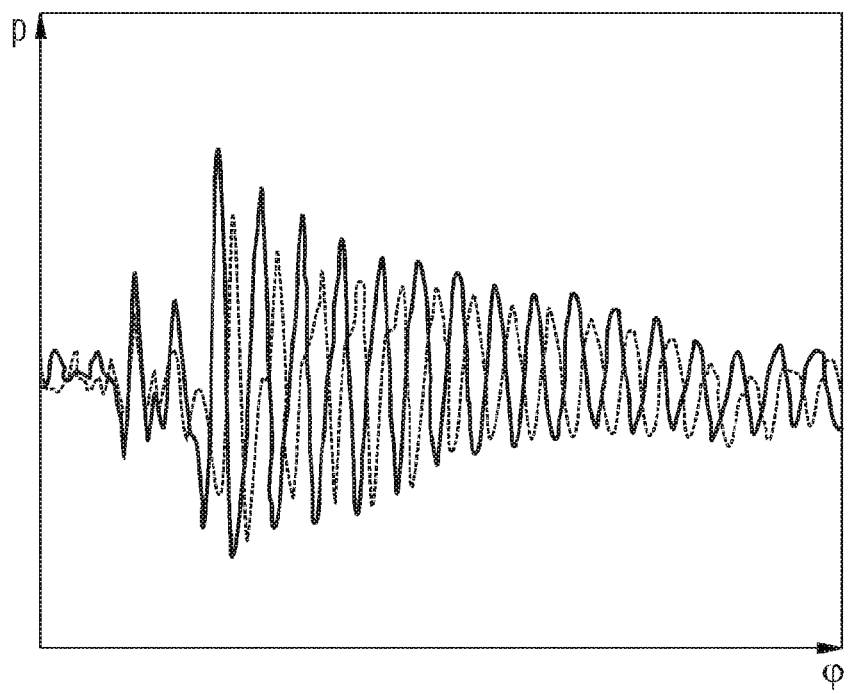
Figure 7:
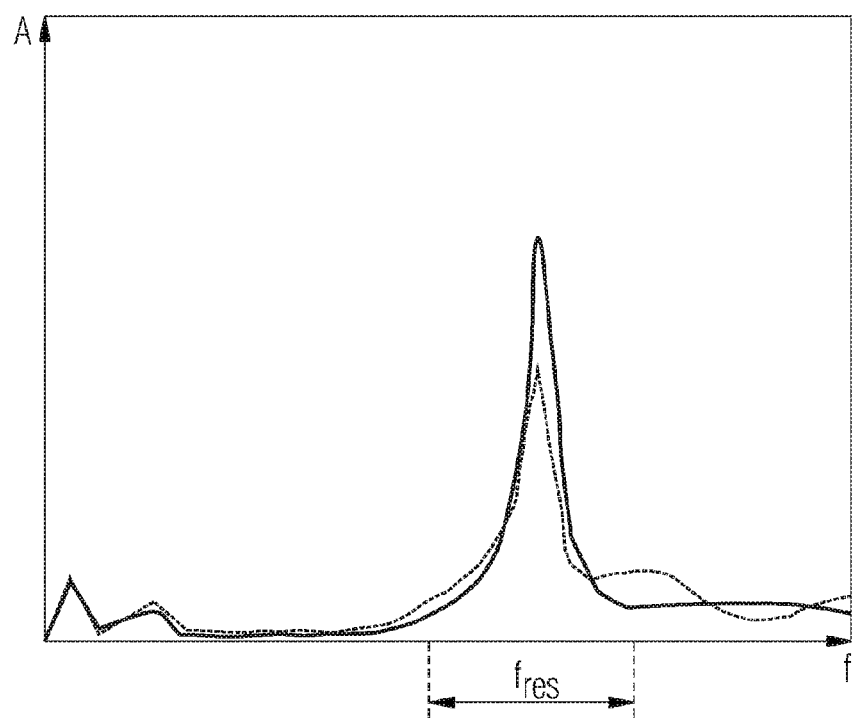

In a first exemplary embodiment, which is illustrated in FIGS. 3 to 7, for determining said vibration-optimized adjustment the injection instant $SOI_2$ of the pilot injection 2 is varied relative to the injection instant $SOI_1$ of the main injection 1. In FIG. 3 it may be seen that as a result of such a variation the time interval $\Delta SOI$ between the two individual injections varies and, in the illustrated case of an advance of the pilot injection 2 to the earlier varied injection instant $SOI_i'$, increases to a varied time interval $\Delta SOI'$. The total injection quantity Q and, in the present case, also the individual injection quantities $Q_1$ and $Q_2$ on the other hand remain constant in the present example. FIG. 4 shows in the form of a dotted line how, as a result of the slight advance of the injection instant $SOI_2$ of the pilot injection 2 shown in FIG. 3, the resulting pressure p varies compared to the resulting pressure p before this variation, which is represented as a solid line. FIG. 5 shows as a function of a frequency f an amplitude A of frequency components of the time characteristics of the resulting pressure p shown in FIG. 4, namely as a solid line before, and as a dotted line after, said variation of the injection instant $SOI_2$ and/or of the time interval $\Delta SOI$. In a corresponding manner FIGS. 6 and 7 show the pressure characteristics p and the frequency-dependent amplitudes A as solid lines before, and as dotted lines after, a variation, in which the injection instant $SOI_2$ of the pilot injection 2 is shifted slightly backwards, so that the time interval $\Delta SOI$ decreases.

FIGS. 4 to 7 clearly show that the amplitudes of a pressure fluctuation of the resulting pressure p in each case decrease as a result of the varying of the injection instant $SOI_2$ relative to the initial situation shown in FIG. 1, the reason for this being that the pressure characteristics, which are represented in the diagrams 4 and 5 of FIG. 2 and are attributable to the individual injections, destructively interfere after said variations.

The vibration-optimized adjustment is then determined by the optimization algorithm in such a way that at least one of the following criteria is met:
a greatest amplitude of a resulting pressure fluctuation of the resulting pressure p within a working cycle of the internal combustion engine assumes an absolute or relative minimum and/or falls below a defined threshold,
a greatest amplitude A of frequency components of the resulting pressure fluctuation that fall into a defined frequency band $f_{res}$ assumes an absolute or relative minimum and/or falls below a defined threshold,
a squared amplitude of the resulting pressure fluctuation that is integrated over a defined part of a working cycle of the internal combustion engine assumes an absolute or relative minimum and/or falls below a defined threshold,
a squared amplitude $A^2$ of frequency components of the resulting pressure fluctuation that is integrated over a defined frequency band $f_{res}$ assumes an absolute or relative minimum and/or falls below a defined threshold.

The vibration-optimized adjustment, which in the present case corresponds to the dotted lines of FIGS. 6 and 7, is thus computationally determined, the optimization algorithm being implemented for in each case one injector of each of the eight cylinders.

In the present exemplary embodiment the device programmed to implement the method comprises an engine control unit of the internal combustion engine, wherein the injection device is automatically adjusted by this engine control unit in accordance with the adjustment determined by the described method. In this case, the computational determination of the vibration-optimized adjustment by simulation of the time characteristic of the resulting pressure p and by use of the optimization method is effected in each case on the basis of parameter values that correspond to the actual engine running state. For this purpose, the device further comprises a pressure sensor for measuring the initial pressure of the fuel, i.e. an initial value of the resulting pressure p, as well as a temperature sensor for acquiring a fuel temperature.

An alternative embodiment provides that it is implemented at a correspondingly programmed device, which is independent of the internal combustion engine, for simulating the characteristic of the resulting pressure p and for using the optimization method, wherein this device determines the vibration-optimized adjustment in a corresponding manner and outputs parameters that characterize this adjustment, namely the injection instants $SOI_i$ for i=1 and i=2 as well as the individual injection quantities $Q_i$. The individual internal combustion engine or a plurality of identical-type internal combustion engines from a corresponding series is and/or are then adjusted in accordance with the result thus obtained.

A further modification of the described method provides that the time characteristic of the resulting pressure p, instead of a simulation, is measured at the running engine by a pressure sensor with correspondingly precise time resolution, wherein said adjustment is empirically determined by means of a corresponding optimization method, i.e. likewise with a varying of at least the injection instant $SOI_i$ of at least one individual injection and/or of the individual injection quantity $Q_i$ of at least one individual injection, by acquiring a dependence of the temporal fluctuations of the resulting pressure p upon the varied quantities.

With reference to FIGS. 8 to 11 an embodiment is described, in which for determining the vibration-optimized adjustment of the injection device, which again provides an injection operation comprising two injections for each cylinder and each working cycle, not only is the time interval $\Delta SOI$ between the two individual injections varied, but also the individual injection quantities of the individual injections. The individual injections are once again a main injection 1 and a pilot injection 2, wherein an optimization algorithm used for this embodiment provides that both the injection instant $SOI_2$ of the pilot injection 2 relative to the injection instant $SOI_1$ of the main injection 1 and the injection quantity $Q_2$ of the pilot injection 2 are varied, the total injection quantity $Q=Q_1+Q_2$ remaining constant. In this case, the vibration-optimized adjustment is once again determined in such a way that at least one of the criteria already mentioned in connection with the previous exemplary embodiment is met. Once again the method is implemented for each injector, i.e. for each cylinder of the internal combustion engine, namely in a computational manner at a correspondingly programmed engine control unit of the internal combustion engine, wherein the time characteristic of the resulting pressure p as a function of the quantities $Q_1$, $SOI_1$, $Q_2$ and $SOI_2$ as well as of external parameters is simulated by means of said hydraulic model. The injection device is then once again adjusted in accordance with the result thus obtained.

An alternative once again provides that the method of determining the vibration-optimized adjustment is implemented externally at a correspondingly programmed device, which as a result outputs adjustment parameters for the injection device of internal combustion engines of the corresponding design.

Figure 9:
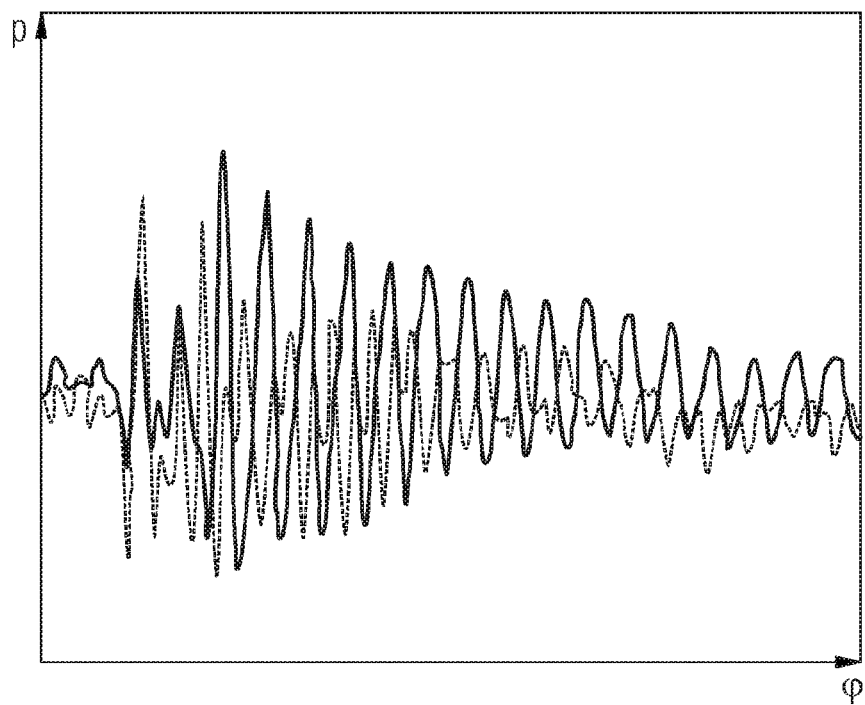

FIG. 9 shows the time characteristic of the resulting pressure p as a function of the crankshaft angle φ for the adjustments of the injection device that are represented in FIG. 8, namely as a solid line for the adjustment before the variation of the injection instant $SOI_2$ and the individual injection quantities $Q_i$ and as a dotted line after this variation, in which the injection instant $SOI_2$ of the pilot injection 2 has been advanced slightly relative to the initial adjustment already shown in FIG. 1, wherein the individual injection quantity $Q_2$ of the pilot injection 2 has been slightly increased and the injection quantity $Q_1$ of the main injection 1 has been correspondingly reduced.

Figure 10:
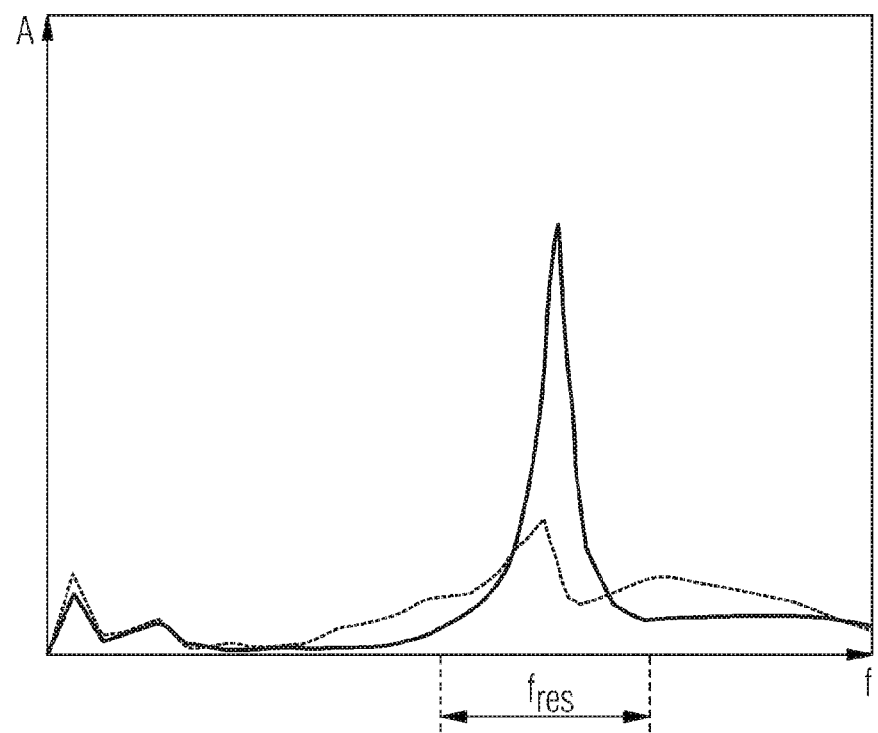

After this variation a slightly increased time interval $\Delta SOI'$ arises between the injection instant $SOI_1$ of the main injection 1 and the advanced injection instant $SOI_2'$ of the pilot injection 2. FIG. 10 shows in a representation corresponding to FIGS. 5 and 7 the frequency spectrum of the pressure characteristics of the resulting pressure p for these two adjustments, namely as a solid line before, and as a dotted line after, the variation of FIG. 8. In FIGS. 9 and 10 it may clearly be seen that the amplitude of the resulting pressure p as well as the frequency-dependent amplitude A at least within the frequency band $f_{res}$ has been drastically reduced by the described variation.

FIG. 11 shows in a representation corresponding to FIG. 2 how this amplitude reduction comes about as a result of a destructive interference between the two pressure waves, which originate from the two individual injections and the pressure characteristics of which are represented there in the diagrams 4 and 5. The second diagram 4 of FIG. 11 shows a pressure characteristic of the pressure wave that is triggered by an opening of the corresponding injector for the pilot injection 2, while the third diagram 5, as already in FIG. 2, shows a corresponding representation of the pressure wave that is caused by the main injection. An altered quantity ratio between the two individual injections and the time shift of the pilot injection 2 now give rise to a destructive interference, which is represented in FIG. 11 and leads to the time characteristic of the resulting pressure p, which is shown in the first diagram 3 of FIG. 11 and corresponds to the dotted line of the diagram of FIG. 9.

The variations of the injection instants $SOI_i$ and of the individual injection quantities $Q_i$ that are shown in FIGS. 3 to 7 and 8 to 11 for the example of an injection operation comprising a main injection 1 and a pilot injection 2 may be carried out in an identical manner also for injection operations that comprise a main injection 1 and a post-injection 6. Such an injection operation is shown in FIG. 12 in a representation corresponding to FIG. 1. In this case, the post-injection 6 has an injection instant $SOI_6$, which lies at a later time than the injection instant $SOI_1$ of the main injection 1, and is used to regenerate a particle filter in an exhaust system of the internal combustion engine. The post-injection 6 could of course also be provided in addition to a pilot injection for example of the type shown in FIG. 1 that precedes the main injection 1.

In an exemplary embodiment that is described with reference to FIGS. 12 to 15, for determining the vibration-optimized adjustment the number of individual injections per cylinder and working cycle is also varied. Thus, here at first only the two individual injections shown in FIG. 12 are provided, namely the main injection 1 and the post-injection 6. For determining the vibration-optimized adjustment of the injection device the post-injection 6 is then apportioned to two individual injections 7 and 8, thereby resulting in a diagram of the injection operation that is represented in FIG. 13, wherein a relative time interval $\Delta SOI$ between the two individual injections 7 and 8 and/or an apportionment of a post-injection quantity $Q_n = Q_7 + Q_8$ to these individual injections 7 and 8 is varied in the manner already described with reference to the other exemplary embodiments. FIG. 14 therefore shows the injection operation in the case of an adjustment, in which for the individual injection quantity $Q_7$ of the earlier individual injection 7 and for the individual injection quantity $Q_8$ of the later individual injection 8 the following applies: $Q_7 = 2/3 \times Q_n$, $Q_8 = 1/3 \times Q_n$. In the case of the adjustment represented in FIG. 13, on the other hand, $Q_7 = Q_8 = Q_n/2$.

Figure 15:
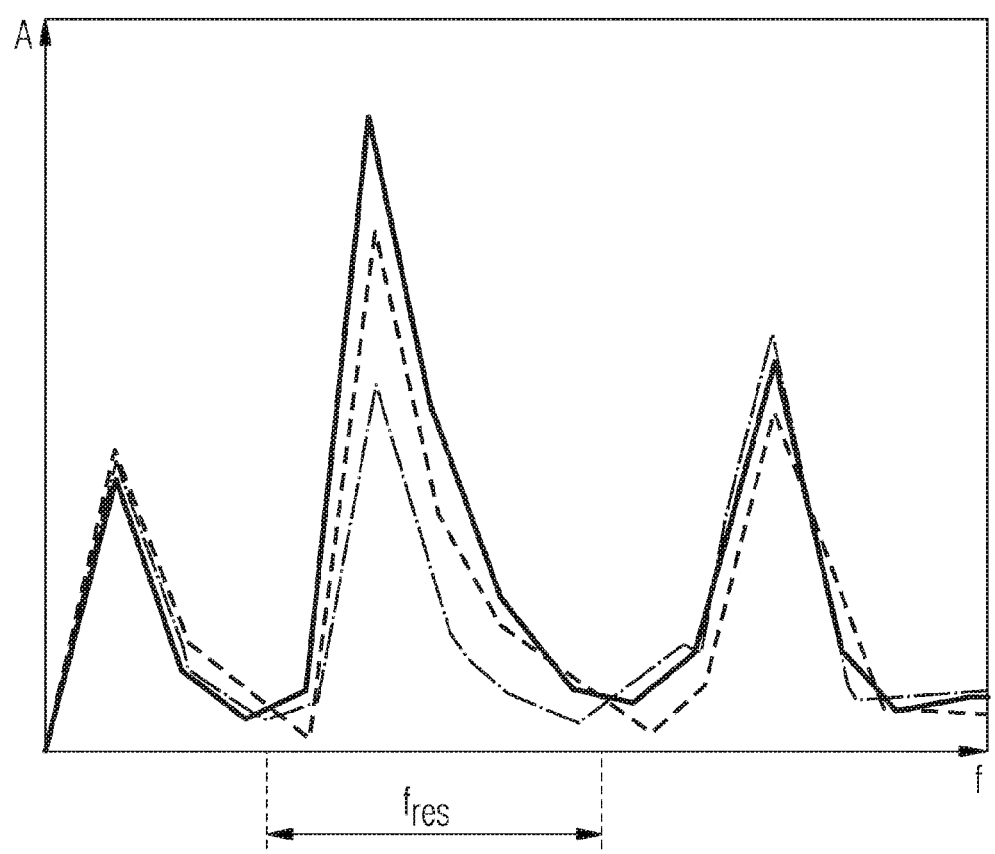

FIG. 15 shows in a diagram as a function of the frequency f a frequency-dependent amplitude A of the resulting pressure p in the fuel line for the adjustments of FIGS. 12 to 14, namely in the form of a solid line the frequency-dependent amplitude A for the adjustment of FIG. 12, in which a single post-injection 6 is provided, in the form of a dashed line the identical quantity for the adjustment of FIG. 14, in which the post-injection quantity $Q_n$ is apportioned unequally to the two individual injections 7 and 8, and in the form of a dash-dot line the identical frequency-dependent amplitude A for the adjustment of FIG. 13 with an equal apportionment of the post-injection quantity $Q_n$ to the individual injections 7 and 8. Within the frequency band $f_{res}$, into which a critical mechanical resonance of the internal combustion engine falls, the result is accordingly a particularly low amplitude A for the adjustment of FIG. 13, which is selected as the vibration-optimized adjustment.

FIG. 15 shows that in the event of an evaluation of the time characteristic of the resulting pressure p and/or of the frequency-dependent amplitude A of the fluctuations of this pressure p according to an alternative criterion, according to which the amplitude A for example at higher frequencies above the frequency band $f_{res}$ is to be minimized, occasionally a different adjustment might be preferable. The result of the optimization to be implemented therefore depends upon the precise definition of the previously described criteria, which may be determined as a function of which frequencies are particularly critical with regard to noise generation, harsh running of the engine or other disturbing vibrations.

The embodiment described here with reference to FIGS. 12 to 14, in which an individual injection is apportioned to a plurality of individual injections 7 and 8, is naturally applicable in a corresponding manner also to individual injections other than the post-injection 6 used here. In particular, the adjustment of an injection device might also be varied in such a way that a pilot injection 2 for example of the type shown in FIG. 1 is apportioned to two or more individual injections in order to obtain a vibration-optimized adjustment.

The methods proposed by the various embodiments may, depending on their embodiment, be used as assistance for a subsequently manually realizable NVH correction or also for automatic NVH self-calibration (NVH stands for noise vibration harshness).

The invention claimed is:

1. A method of determining a vibration-optimized adjustment of an injection device of an internal combustion engine, the method comprising:
providing for a specific engine adjustment by the injection device for each cycle of the internal combustion engine a plurality of at least two individual injections per cylinder, each of which is defined at least by a relative injection instant and an individual injection quantity,
wherein a time characteristic of a resulting pressure that is influenced by pressure waves caused by the individual consecutive injections is determined in a fuel-carrying part of the injection device, wherein said adjustment is determined by varying the injection instant of at least one of: at least one individual injection and an individual injection quantity of at least one individual injection in such a way that this adjustment is characterized by a reduced temporal fluctuation of the resulting pressure as a result of interferences between said pressure waves;
wherein said adjustment is determined computationally, wherein the time characteristic of the resulting pressure is determined by simulation using a hydraulic model.

2. The method according to claim 1, wherein said adjustment is determined automatically by using an optimization algorithm.

3. The method according to claim 1, wherein at least one of: the at least one varied injection instant and the at least one varied individual injection quantity for determining said adjustment is varied only within defined limits.

4. The method according to claim 1, wherein said adjustment is determined as meeting at least one of the following criteria:
a greatest amplitude of a resulting pressure fluctuation of the resulting pressure at least one of: assumes an absolute or relative minimum and falls below a defined threshold,
a greatest amplitude of frequency components of the resulting pressure fluctuation that fall into a defined frequency band at least one of: assumes an absolute or relative minimum and falls below a defined threshold,
a squared amplitude of the resulting pressure fluctuation that is integrated over a defined part of a cycle at least one of: assumes an absolute or relative minimum and falls below a defined threshold, and
a squared amplitude of frequency components of the resulting pressure fluctuation that is integrated over a defined frequency band at least one of assumes an absolute or relative minimum and falls below a defined threshold.

5. The method according to claim 1, wherein for determining the time characteristic of the resulting pressure a pressure characteristic originating from an individual injection is determined by simulation and the resulting pressure is determined by superposition of such pressure characteristics.

6. The method according to claim 1, wherein the simulation is implemented by means of a hydraulic model while simultaneously taking into account at least one subgroup of the following parameters: fuel temperature, initial pressure of the fuel, elastic modulus of the fuel, density of the fuel, viscosity of the fuel, sound velocity in the fuel, engine speed, engine power.

7. The method according to claim 6, wherein at least one subgroup of said parameters that are taken into account for the simulation is measured at the running internal combustion engine by means of at least one sensor.

8. The method according to claim 1, wherein the time characteristic of the resulting pressure is measured by a pressure sensor and said adjustment is determined empirically during operation of the internal combustion engine by acquiring a dependence of the temporal fluctuations of the resulting pressure upon the varied quantities.

9. The method according to claim 1, wherein in addition the injection device is adjusted automatically in accordance with the adjustment thus determined.

10. The method according to claim 1, wherein the method is implemented at a correspondingly programmed control unit of the internal combustion engine.

11. The method according to claim 1, wherein the plurality of individual injections comprises in addition to a main injection at least one of: at least one pilot injection and one post-injection.

12. The method according to claim 11, wherein for determining said adjustment the injection instant of the pilot injection or of the post-injection is varied relative to the injection instant of the main injection.

13. The method according to claim 11, wherein for determining said adjustment the individual injection quantity of the pilot injection is varied, while the total injection quantity remains constant.

14. The method according to claim 1, wherein for determining said adjustment in addition the number of individual injections per cylinder and cycle is varied.

15. The method according to claim 14, wherein at least one pilot injection or one post-injection is apportioned to at least two individual injections and a relative time interval between at least one of: said at least two individual injections and an apportionment of a post-injection quantity to said individual injections is varied in order to determine said adjustment.

16. A device for determining a vibration-optimized adjustment of an injection device of an internal combustion engine, wherein it is devised in terms of programming to implement a method as claimed in claim 1.

17. The device according to claim 16, wherein the device comprises an engine control unit or part of an engine control unit.

18. The device according to claim 16, wherein the device comprises at least one sensor for acquiring parameters that are taken into account when determining the vibration-optimized adjustment.

19. An internal combustion engine, comprising a device according to claim 16.

20. A method of determining a vibration-optimized adjustment of an injection device of an internal combustion engine, the method comprising:
providing for a specific engine adjustment by the injection device for each cycle of the internal combustion engine a plurality of at least two individual injections per cylinder, each of which is defined at least by a relative injection instant and an individual injection quantity,
wherein a time characteristic of a resulting pressure that is influenced by pressure waves caused by the individual injections is determined in a fuel-carrying part of the injection device, wherein said adjustment is determined by varying the injection instant of at least one of: at least one individual injection and an individual injection quantity of at least one individual injection in such a way that this adjustment is characterized by a reduced temporal fluctuation of the resulting pressure as a result of interferences between said pressure waves;

wherein said adjustment is determined as meeting at least one of the following criteria:
- a greatest amplitude of a resulting pressure fluctuation of the resulting pressure at least one of: assumes an absolute or relative minimum and falls below a defined threshold,
- a greatest amplitude of frequency components of the resulting pressure fluctuation that fall into a defined frequency band at least one of: assumes an absolute or relative minimum and falls below a defined threshold,
- a squared amplitude of the resulting pressure fluctuation that is integrated over a defined part of a cycle at least one of: assumes an absolute or relative minimum and falls below a defined threshold, and
- a squared amplitude of frequency components of the resulting pressure fluctuation that is integrated over a defined frequency band at least one of assumes an absolute or relative minimum and falls below a defined threshold.

* * * * *

UNITED STATES PATENT AND TRADEMARK OFFICE
CERTIFICATE OF CORRECTION

PATENT NO. : 8,543,313 B2  
APPLICATION NO. : 12/741433  
DATED : September 24, 2013  
INVENTOR(S) : Fredrik Borchsenius et al.

Page 1 of 1

It is certified that error appears in the above-identified patent and that said Letters Patent is hereby corrected as shown below:

Title Page
Item (75), Inventors, 4$^{th}$ inventor, "Olivier Lobey, Nice (DE)," should read "Olivier Libey, Nice (FR)"

Signed and Sealed this
Nineteenth Day of November, 2013

Teresa Stanek Rea
*Deputy Director of the United States Patent and Trademark Office*